Oct. 3, 1944.  W. W. EITEL ET AL  2,359,514
METHOD OF MAKING GRIDS
Filed Aug. 24, 1942  2 Sheets-Sheet 1
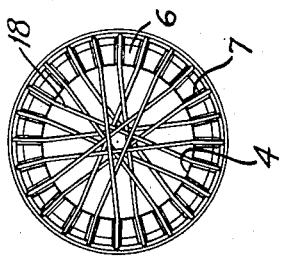
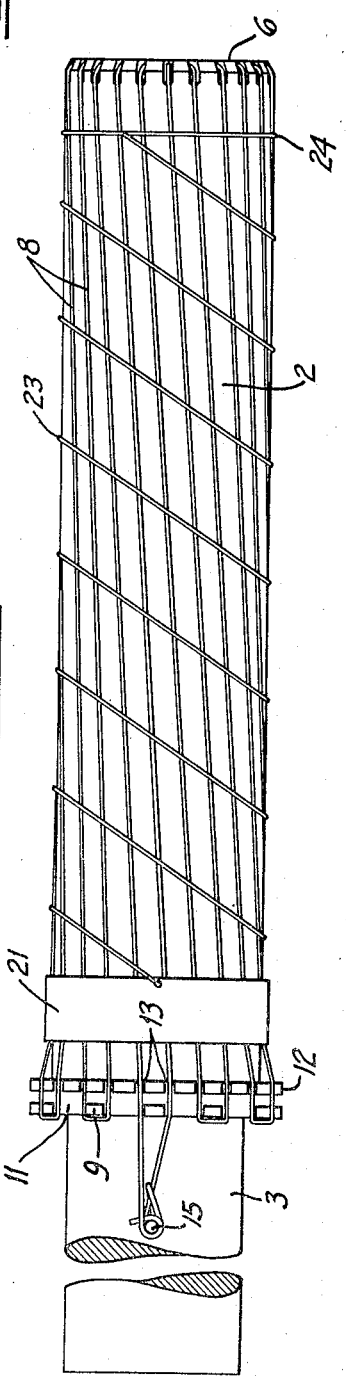
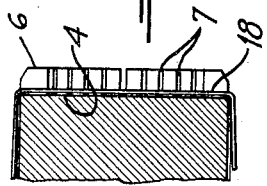
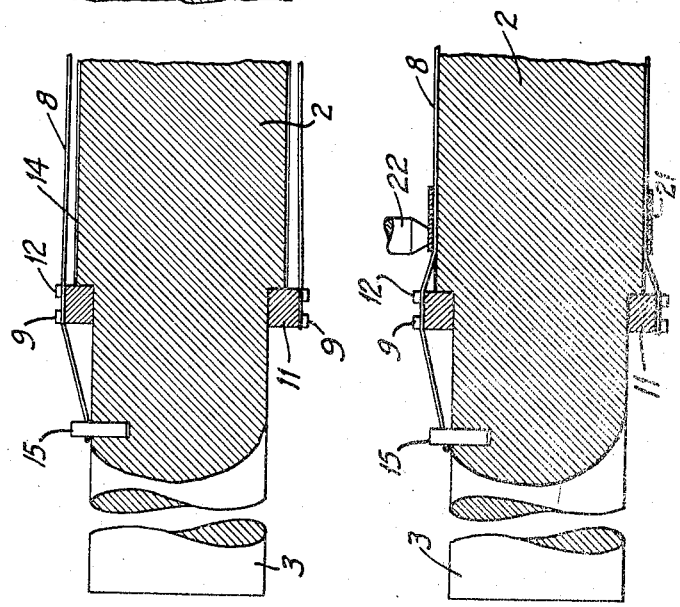
INVENTORS
WILLIAM W. EITEL
JACK A. McCULLOUGH
BY Harold E. Long
THEIR ATTORNEY

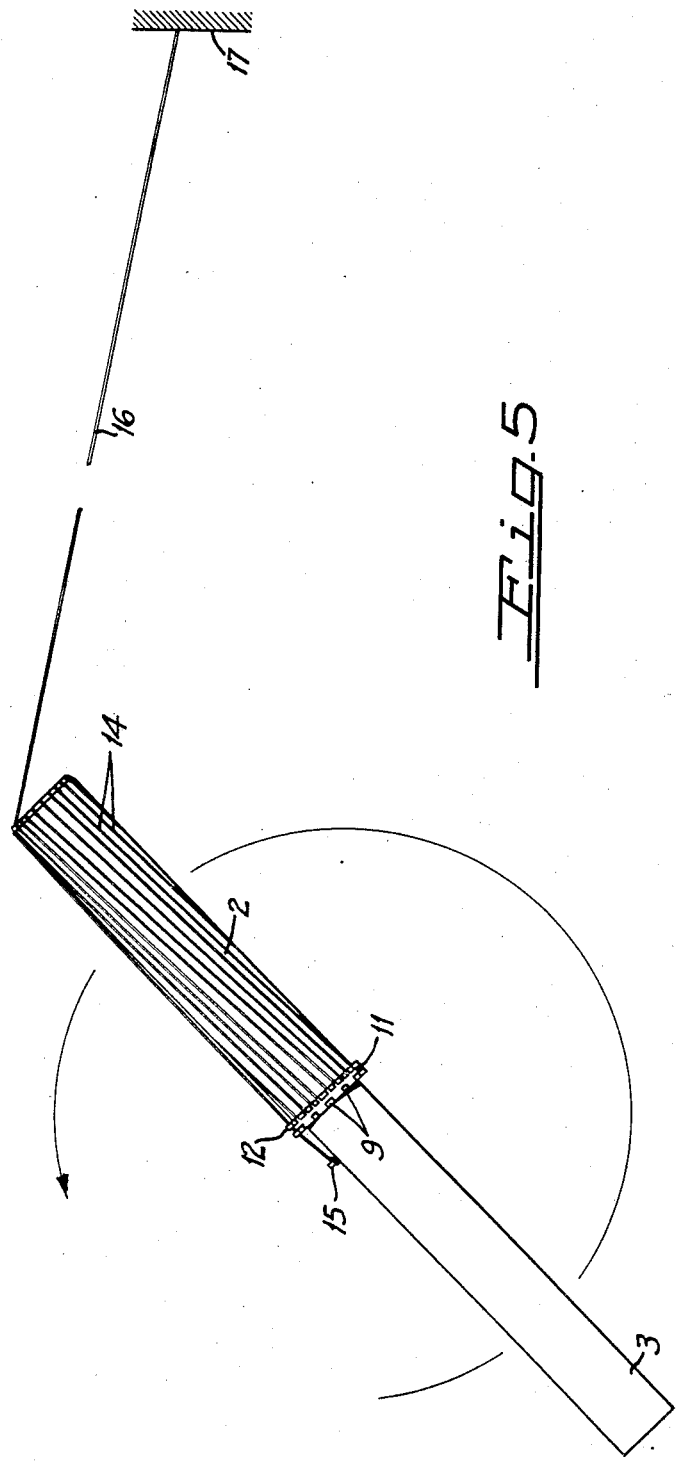

Patented Oct. 3, 1944

2,359,514

UNITED STATES PATENT OFFICE 2,359,514

METHOD OF MAKING GRIDS

William W. Eitel, San Bruno, and Jack A. McCullough, Millbrae, Calif., assignors to Eitel-McCullough, Inc., San Bruno, Calif., a corporation of California Application August 24, 1942, Serial No. 456,126

9 Claims. (Cl. 140—71.5)

Our invention relates to the manufacture of a cage-type grid electrode for electronic tubes.

It is among the objects of our invention to provide an improved method of making a grid of the character described, whereby the grid bars are more accurately positioned and uniformly tensioned.

Another object is to provide a method which facilitates grid fabrication.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is a side elevational view of our improved mandrel having a grid formed thereon; and Figure 2 is an end view of the same.

Figures 3 and 4 are fragmentary sectional views of the mandrel at different stages of forming the grid; and Figure 5 is a diagrammatic side elevational view illustrating our method.

In terms of broad inclusion, our method of making a cage-type wire grid comprises forming the grid with its longitudinal wire bars diverging toward one end thereof; engaging over the other end of the grid a ring having a diameter substantially equal to that of the final grid; and forcing the ring axially of the grid to bring the bars into parallelism and apply tension thereto. The grid is preferably formed on a mandrel having an annular row of pegs spaced below a top end thereof by the steps of securing an end of a wire to the mandrel, looping the wire up along a side and over the top and down along the opposite side of the mandrel to form a pair of grid bars, hooking the wire over a peg, relooping the wire over the end of the mandrel to form another pair of grid bars, hooking the wire over another peg, and continuing the looping and hooking steps until the desired number of grid bars are made.

After applying the tensioning ring it is welded to the bars. A reinforcing helix is also preferably welded to the bars; after which the wires are severed at the edge of the ring adjacent the pegs, and the grid removed from the mandrel.

In greater detail, and referring to the drawings, the grid is formed on a mandrel comprising an elongated cylindrical core 2, preferably of copper, having a lower extension 3 providing a handle. This core has a diameter substantially equal to the inside diameter of the grid. The upper end of the core has a recess 4 bounded by an annular flange 6 having a series of radial wire receiving slots 7. Twenty-four slots are shown, it being understood that this number may be varied depending on the number of grid bars 8 desired.

An annular row of radial pegs 9 is spaced below the upper end of the core a distance depending upon the length of grid desired. In a mandrel for a 24-bar grid there are twelve of these pegs. The base ends of the pegs are spaced from the surface of core 2 by a collar 11 press-fitted onto the core and on which the pegs are integrally formed. A flange 12 is also preferably formed on the collar ahead of pegs 9 and has a series of twenty-four wire spacing slots 13 aligned with the edges of the pegs. Wire receiving grooves 14, preferably cut at a slight angle to the mandrel axis, are provided in core 2 between pegs 9 and slots 7. A tie pin 15 on handle 3 adjacently below the row of pegs completes the mandrel structure.

Our method of making the grid comprises fastening an end of a wire 16 to a fixed element 17, and tying the other end to mandrel pin 15. The operator then turns the mandrel counter-clockwise as viewed in Figure 3 about an axis transverse to the mandrel axis to loop the wire up along a side and over the top and down along the opposite side of the core to form a pair of the grid bars 8. These bars thus lie along grooves 14 and are connected at the top by a bight 18 engaging a pair of the slots 7. The operator then hooks the wire about a peg 9; again turns the mandrel about the transverse axis to reloop the wire over the end; and hooks the wire about another peg, thus forming another pair of grid bars. These looping and hooking steps are continued until all twenty-four grid bars are laid. The other end of the wire is then tied to pin 15 and released from fixed element 17. At this stage the grid structure appears as shown in Figure 3.

Recess 4 at the end of the mandrel core provides space for bights 18 criss-crossing at the top. In fabricating a grid having a large number of bars, bights 18 are preferably laid offcenter through slots 7 so that the crossovers come at different points instead of all piling up at the center. See Figure 2.

Since the bases of pegs 9 are spaced from the surface of core 2, grid bars 8 diverge outwardly toward the pegged ends, and thus lie in conical formation. The slope of the bars is illustrated in Figure 3. This is to apply tension to the wire bars when ring 21 is applied.

Ring 21 is a metallic band having a diameter slightly larger than core 2 so that it fits snugly over bars 8 lying in shallow grooves 14. The ring is engaged over the top end of the mandrel and is forced inwardly by sliding it axially along the bars to the final position shown in Figure 1; the structure with ring 21 applied also being illustrated in Figure 4. As the wires are constricted inwardly from initial conical formation toward the cylindrical surface of core 2 they are put under tension. This straightens out the bars and brings them into parallelism, with each bar lying in its respective groove 14.

Inasmuch as the grid at this stage is all one piece of wire, merely looped back and forth on the mandrel, there is a compensating action or movement permitted between the several lengths of wire when ring 21 is forced on. This tends to equalize the tension in bars 8, and prevents the wires from breaking; it being further noted that there are no welds between the wires or between the wires and ring 21 to break loose when tension is being applied.

Ring 21 forms the terminal element at the base of the final grid structure, and is therefore welded to bars 8. This is done by passing a suitable welding current through the mandrel (which functions as an electrode) and another electrode 22 engaged with the outer surface of ring 21 as illustrated in Figure 4. Subsequently, one or more wire helixes 23 are welded to bars 8, and a wire ring 24 is welded to the bars adjacent the top of the grid. Core 2 is also used as an electrode for this welding. The wires are then severed at the lower edge of ring 21, and the completed grid is slipped off the end of the mandrel.

We claim:

1. The method of making a cage-type wire grid, which comprises forming the grid with its longitudinal wire bars diverging toward one end thereof, engaging over the other end of the grid a ring having a diameter substantially equal to that of the final grid, and sliding the ring axially along the grid bars to bring the bars into parallelism and apply tension thereto.

2. The method of making a cage-type wire grid, which comprises forming the grid with its longitudinal wire bars diverging toward one end thereof, engaging over the other end of the grid a ring having a diameter substantially equal to that of the final grid, sliding the ring axially along the grid bars to bring the bars into parallelism and apply tension thereto, and then welding the ring to the bars.

3. The method of making a cage-type wire grid, which comprises forming the grid with its longitudinal wire bars diverging toward one end thereof, engaging over the other end of the grid a ring having a diameter substantially equal to that of the final grid, sliding the ring axially along the grid bars to bring the bars into parallelism and apply tension thereto, welding the ring to the bars, and then welding a reinforcing wire helix to said bars.

4. The method of making a cage-type wire grid, which comprises providing a mandrel, laying wire grid bars longitudinally along the sides of the mandrel with ends of the bars connected in pairs at an end of said mandrel, fastening the other ends of the bars at points spaced from the surface of the mandrel, engaging over said end of the mandrel a ring having a slightly larger diameter, and forcing the ring along the mandrel to bring the bars into parallelism with said surface and to apply tension thereto.

5. The method of making a cage-type wire grid, which comprises providing a mandrel with an annular row of pegs spaced below a top end thereof, securing an end of a wire to the mandrel, looping the wire up along a side and over the top and down along the opposite side of the mandrel to form a pair of grid bars, hooking the wire over a peg, relooping the wire over the end of the mandrel to form another pair of grid bars, hooking the wire over another peg, and continuing the looping and hooking steps until the desired number of grid bars are made.

6. The method of making a cage-type wire grid, which comprises providing a mandrel with an annular row of pegs spaced below a top end thereof, securing an end of a wire to the mandrel, looping the wire up along a side and over the top and down along the opposite side of the mandrel to form a pair of grid bars, hooking a wire over a peg, relooping the wire over the end of the mandrel to form a pair of grid bars, hooking the wire over another peg, continuing the looping and hooking steps until the desired number of grid bars are made, securing the other end of the wire to the mandrel, applying a ring over the bars, welding the ring to said bars, severing the wires at the edge of the ring adjacent to the pegs, and removing the grid from the mandrel.

7. The method of making a cage-type wire grid, which comprises providing a mandrel with an annular row of pegs spaced below a top end thereof, fastening an end of a wire to a fixed element, securing the other end of the wire to the mandrel, turning the mandrel about an axis transverse to its own axis to loop the wire up along a side and over the top and down along the opposite side of the mandrel to form a pair of grid bars, hooking the wire over a peg, again turning the mandrel about said transverse axis to reloop the wire over the end of the mandrel to form another pair of grid bars, hooking the wire over another peg, and continuing the looping and hooking steps until the desired number of grid bars are made.

8. The method of making a cage-type wire grid, which comprises providing a mandrel having longitudinal grooves in the surface thereof, laying wire grid bars along the sides of the mandrel adjacent said grooves with ends of the bars connected in pairs at an end of said mandrel, fastening the other ends of the bars at points spaced from the surface of the mandrel, engaging over said end of the mandrel a ring having a slightly larger diameter, and forcing the ring along the mandrel to depress the bars into said grooves and to apply tension thereto.

9. The method of making a cage-type wire grid, which comprises providing an electrode-mandrel, laying wire grid bars longitudinally along the sides of the mandrel with ends of the bars connected in pairs at an end of the mandrel, fastening the other ends of the bars at points spaced from the surface of said mandrel, engaging over said end of the mandrel a ring having a slightly larger diameter, forcing the ring along the mandrel to bring the bars into contact with the mandrel along the major portion of their length and to apply tension thereto, engaging another electrode with the outer surface of said ring, and passing current through the electrode-mandrel and said other electrode to weld the ring to a grid bar.

WILLIAM W. EITEL.
JACK A. McCULLOUGH.